United States Patent
Van Phan et al.

(10) Patent No.: US 12,401,460 B2
(45) Date of Patent: Aug. 26, 2025

(54) METHOD OF SIDELINK GROUPCASTING, AND NETWORK NODE THEREOF

(71) Applicant: Nokia Technologies OY, Espoo (FI)

(72) Inventors: Vinh Van Phan, Oulu (FI); Ling Yu, Kauniainen (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 377 days.

(21) Appl. No.: 17/917,281

(22) PCT Filed: Mar. 25, 2021

(86) PCT No.: PCT/EP2021/057779
§ 371 (c)(1),
(2) Date: Oct. 6, 2022

(87) PCT Pub. No.: WO2021/204556
PCT Pub. Date: Oct. 14, 2021

(65) Prior Publication Data
US 2023/0163892 A1 May 25, 2023

Related U.S. Application Data

(60) Provisional application No. 63/007,440, filed on Apr. 9, 2020.

(51) Int. Cl.
*H04H 20/71* (2008.01)
*H04L 1/1812* (2023.01)
(Continued)

(52) U.S. Cl.
CPC .......... *H04L 1/1819* (2013.01); *H04W 72/30* (2023.01); *H04W 72/40* (2023.01)

(58) Field of Classification Search
CPC ............... H04W 72/30; H04W 72/40; H04J 2203/0019; H04L 12/18; H04L 12/185;
(Continued)

(56) References Cited

U.S. PATENT DOCUMENTS

| 11,388,733 B2 * | 7/2022 | Huang ............ H04W 76/27 |
| 2020/0099479 A1 | 3/2020 | Park |

(Continued)

FOREIGN PATENT DOCUMENTS

| WO | 2020/063611 A1 | 4/2020 | |
| WO | WO-2020063908 A1 * | 4/2020 | ........... H04L 1/1671 |

OTHER PUBLICATIONS

'Feature lead summary for AI 7.2.4.5 Physical layer procedures for sidelink' 3GPP TSG RAN WG1 #99, Nov. 2019, R1-1913280.
(Continued)

*Primary Examiner* — Shantell L Heiber
(74) *Attorney, Agent, or Firm* — Lippes Mathias LLP

(57) ABSTRACT

The method includes a processor of a first UE receiving first group information for a user group with user-device members, the first group information including information for mapping a sidelink channel resource for each of the user-device members to perform a groupcast communication over sidelink for the user group, the first UE being a user-device member of the user group. The method further includes receiving second group information for transmitting data within the groupcast communication, the second group information including updated information of the first group information that is specific to the first UE, initiating a first transmission process to transmit a first data block to the user group for the groupcast communication over the sidelink based on the first group information, and adapting the first transmission process of the first data block based on the second group information.

11 Claims, 5 Drawing Sheets

(51) Int. Cl.
   *H04W 72/30* (2023.01)
   *H04W 72/40* (2023.01)
(58) Field of Classification Search
   CPC ... H04L 47/806; H04L 61/5069; H04L 67/1044
   See application file for complete search history.

(56) References Cited

U.S. PATENT DOCUMENTS

| | | | | |
|---|---|---|---|---|
| 2021/0021536 | A1* | 1/2021 | Ganesan | H04L 1/1896 |
| 2021/0344454 | A1* | 11/2021 | Lee | H04L 5/0064 |
| 2021/0344473 | A1* | 11/2021 | Sun | H04L 5/0055 |
| 2023/0337140 | A1* | 10/2023 | Miao | H04L 5/0053 |

OTHER PUBLICATIONS

'New WID on NR sidelink enhancement' 3GPP TSG RAN Meeting #86, LG Electronics, RP-193231, Dec. 2019.
Interdigital Inc., "On Physical Layer Procedures," 3GPP Draft; R1-1813227 On Physical Layer Procedures, 3GPP, vol. RAN WG1, Nov. 11, 2018.
TCL Communication, "Physical Layer Procedures for Sidelink," 3GPP Draft, R1-1912243, vol. RAN WG1 Nov. 8, 2019.
ZTE et al., "Discussion on PHY Procedures for sidelink," 3GPP Draft, R1-1910299, vol. RAN WG1, Oct. 6, 2019.
International Search Report and Written Opinion issued Jun. 29, 2021 in International Application No. PCT/EP2021/057779.
3rd Generation Partnership Project; Technical Specification Group Services and System Aspects; Architecture enhancements for 5G System (5GS) to support Vehicle-to-Everything (V2X) services (Release 17), 3GPP TS 23.287, V17.40, Sep. 2022.
3rd Generation Partnership Project; Technical Specification Group Radio Access Network; NR; NR and NG-RAN Overall Description; Stage 2 (Release 17), 3GPP TS 38.300, V17.2.0, Sep. 2022.
International Search Report for International Application No. PCT/EP2021/057779 dated Jun. 29, 2021.
Written Opinion of the International Searching Authority for International Application No. PCT/EP2021/057779 dated Jun. 29, 2021.
Office Action dated Jan. 6, 2023, issued in corresponding Indian Patent Application No. 202247063070.
Office Action received for corresponding Japanese Patent Application No. 2022-561441, dated Oct. 5, 2023, 3 pages of Office Action and 4 pages of Summary and Translation available.
"Discussion on groupcast HARQ in NR SL", 3GPP TSG RAN WG2 Meeting #107bis, R2-1913778, Agenda item: 6.4.2, LG Electronics Inc., Oct. 14-18, 2019, pp. 1-5.
"Discussion on Groupcast feedback for NR V2X", 3GPP TSG-RAN WG2 Meeting #107, R2-1909078, Agenda Item: 11.4.2, ZTE, Aug. 26-30, 2019, pp. 1-6.
Notice of Allowance received for corresponding European Patent Application No. 21715552.2, dated Nov. 13, 2023, 8 pages.
Office Action received for corresponding Chinese Patent Application No. 202180034779.7, dated Jun. 28, 2024, 6 pages of Office Action and no page of translation available.

* cited by examiner

METHOD OF SIDELINK GROUPCASTING, AND NETWORK NODE THEREOF

CROSS-REFERENCE TO RELATED APPLICATIONS

This application is a national phase under 35 U.S.C. § 371 of PCT International Application No. PCT/EP2021/057779, which has an International filing date of Mar. 25, 2021, which claims priority to U.S. Application No. 63/007,440, filed Apr. 9, 2020, the entire contents of each of which are hereby incorporated by reference.

BACKGROUND

Field

One or more example embodiments relate to wireless communications networks.

Related Art

Wireless communication networks use multicast or groupcast messages that allow devices to communicate with each other. These messages may include defined groups of devices.

SUMMARY

At least one example embodiment is directed toward a method.

In one example embodiment, the method includes receiving, by at least one first processor of a first user equipment (UE), first group information for a user group with user-device members, the first group information including information for mapping a sidelink channel resource for each of the user-device members to perform a groupcast communication over sidelink for the user group, the first UE being a user-device member of the user group; receiving, by the at least one first processor, second group information for transmitting data within the groupcast communication, the second group information including updated information of the first group information that is specific to the first UE; initiating, by the at least one first processor, a first transmission process to transmit a first data block to the user group for the groupcast communication over the sidelink based on the first group information; and adapting, by the at least one first processor, the first transmission process of the first data block based on the second group information.

In one example embodiment, the first transmission process is a hybrid automatic repeat request (HARQ) process over the sidelink.

In one example embodiment, the sidelink channel resource is a physical sidelink feedback channel (PSFCH).

In one example embodiment, the receiving of the second group information can occur during one of, prior to initiating the first transmission process, or after the initiating of the first transmission process and during a time period while the first transmission process is ongoing.

In one example embodiment, the method further includes receiving first feedback information from the user group, wherein the adapting of the first transmission process includes determining whether to continue with the first transmission process, based on the second group information and the first feedback information.

In one example embodiment, the first feedback information is HARQ feedback information that includes one of an acknowledgment, a negative acknowledgement or discontinuous transmission (DTX) information.

In one example embodiment, the adapting of the first transmission process further includes: initiating a second transmission process to transmit a second data block to the user group for the groupcast communication over the sidelink based on the second group information.

In one example embodiment, the second transmission process includes an indicator that indicates to the user group that the first data block in the first transmission process and the second data block in the second transmission process are the same data block.

In one example embodiment, the method further includes receiving second feedback information from at least one first user-device, of the user-device members of the user group, that the first data block of the first transmission process was received, the second feedback information indicating that the at least one first user-device will ignore the second transmission process.

In one example embodiment, the method further includes receiving DTX feedback information from at least one first user-device, of the user-device members, following the initiating of the first transmission process; initiating a reporting of an identity of the at least one first user-device from an access layer to an application layer at the first UE; and/or ignoring the at least one first user-device during a remainder of the first transmission process.

At least another example embodiment is directed toward a first network node.

In one example embodiment, the first network node includes a memory containing computer-readable instructions; and at least one first processor configured to read and execute the computer-readable instructions, in order to, receive first group information for a user group with user-device members, the first group information including information for mapping a sidelink channel resource for each of the user-device members to perform a groupcast communication over sidelink for the user group, the first network node being a user-device member of the user group, receive second group information for transmitting data within the groupcast communication, the second group information including updated information of the first group information that is specific to the first network node, initiate a first transmission process to transmit a first data block to the user group for the groupcast communication over the sidelink based on the first group information, and adapt the first transmission process of the first data block based on the second group information.

In one example embodiment, the first transmission process is a hybrid automatic repeat request (HARQ) process over the sidelink.

In one example embodiment, the sidelink channel resource is a physical sidelink feedback channel (PSFCH).

In one example embodiment, the at least one first processor is configured to receive the second group information during one of, prior to initiating the first transmission process, or after the initiating of the first transmission process and during a time period while the first transmission process is ongoing.

In one example embodiment, the at least one first processor is further configured to: receive first feedback information from the user group, wherein the adapting of the first transmission process includes determining whether to continue with the first transmission process, based on the second group information and the first feedback information.

In one example embodiment, the first feedback information is HARQ feedback information that includes one of an acknowledgment, a negative acknowledgement or discontinuous transmission (DTX) information.

In one example embodiment, the at least one first processor is configured to adapt the first transmission process by: initiating a second transmission process to transmit a second data block to the user group for the groupcast communication over the sidelink based on the second group information.

In one example embodiment, the second transmission process includes an indicator that indicates to the user group that the first data block in the first transmission process and the second data block in the second transmission process are the same data block.

In one example embodiment, the at least one first processor is further configured to: receive second feedback information from at least one first user-device, of the user-device members of the user group, that the first data block of the first transmission process was received, the second feedback information indicating that the at least one first user-device will ignore the second transmission process.

In one example embodiment, the at least one first processor is further configured to: receive DTX feedback information from at least one first user-device, of the user-device members, following the initiating of the first transmission process, initiate a reporting of an identity of the at least one first user-device from an access layer to an application layer at the first UE, and/or ignore the at least one first user-device during a remainder of the first transmission process.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
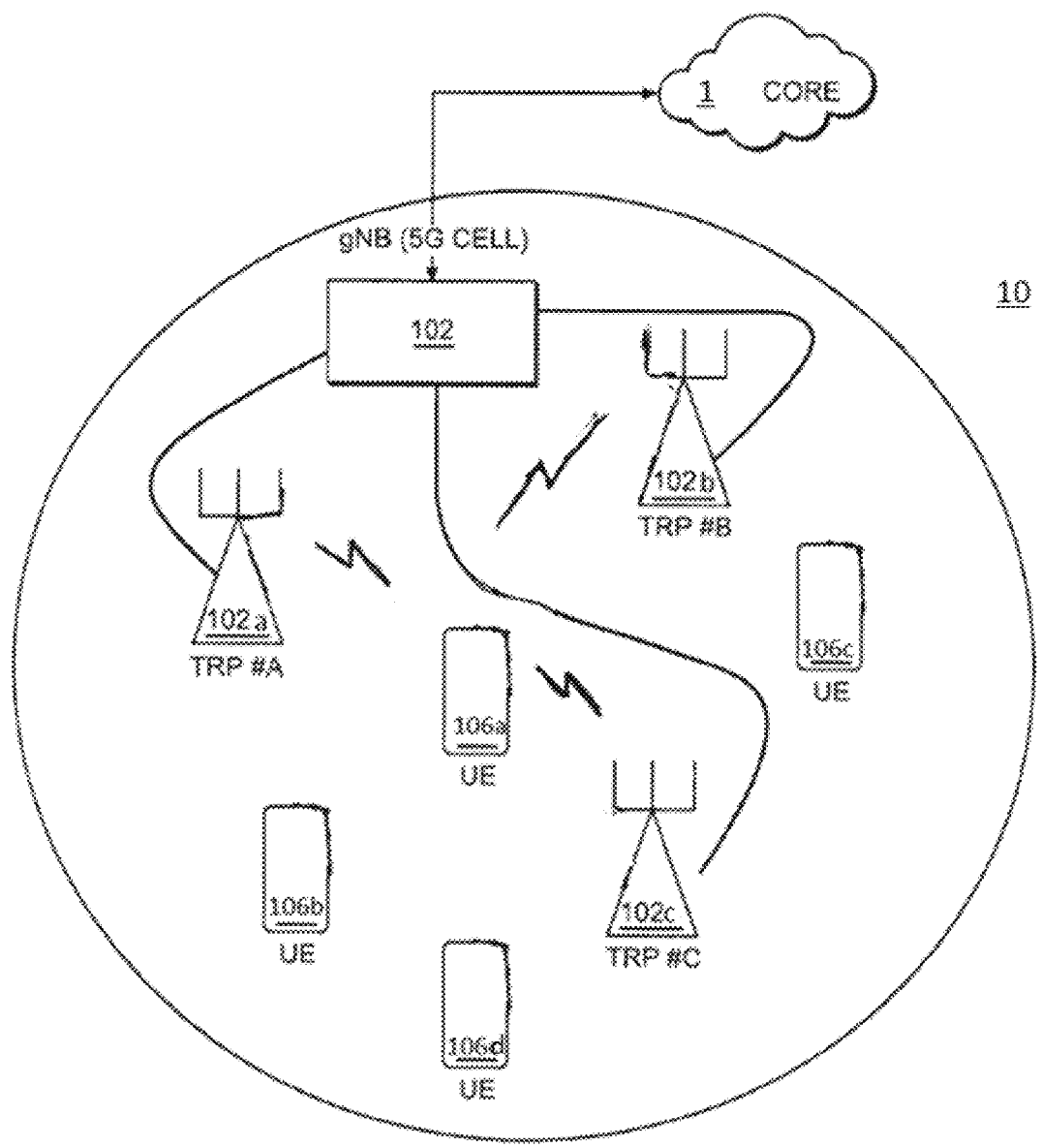
FIG. 1 illustrates a simplified diagram of a wireless communication network for explaining example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of radio network elements (e.g., gNB), user equipment, or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a radio network element (or user equipment) to perform the operations discussed herein.

It will be appreciated that a number of example embodiments may be used in combination.

Introduction

In an example embodiment, sidelink (SL) groupcast with hybrid automatic repeat request (HARQ) feedback can be accomplished using Option 2, as discussed below:

In an example embodiment, PSFCH resource for individual receiving user equipment (Rx UE) is derived using group-member IDs of Rx UE and transmitting user equipment (Tx UE);

In an example embodiment, Tx UE can use HARQ feedback Option 2 only when the group size is not greater than the number of candidate PSFCH resources associated with the selected PSSCH resource. RAN1 assumes that RAN2 will handle selection of appropriate groupcast HARQ feedback option.

In an example embodiment: It is assumed that the V2X application layer provides accurate and up-to-date information on the group size and the member ID to the AS layer.

Discussion

In an example embodiment, it is important in the use of HARQ feedback Option 2 that there is no mismatch on the derived PSFCH resource between Tx UE and Rx UE. Thus, the group information (including member IDs and group size) which is used for deriving PSFCH resources for individual group members must be the same or common to all the group members.

Observation 1: The group information (including member IDs and group size) which is used for deriving PSFCH resources for individual group members must be the same or common to all the group members.

Proposal 1: HARQ feedback Option 2 uses the common group information for PSFCH mapping.

In an example embodiment, a particular Tx UE of an ongoing SL HARQ process may use HARQ feedback Option 2 for a groupcast. In an example embodiment, this may be performed dynamically in time that the number of group members which are actually present in proximity (in range) of Tx UE and able to receive HARQ transmission of the ongoing HARQ process is less than a group size given in the common group information that is used for deriving PSFCH resources. In an example embodiment, this is due to mobility and radio channel condition of individual group members for examples. In an example embodiment, in case Tx UE is not provided with up-to-date information of group members which are present in proximity of Tx UE, referred to as the Tx UE specific group information, Tx UE may expect to receive HARQ feedback from all group members given in the common group information, including those group members which are not present in proximity of Tx UE during the ongoing HARQ process. In an example embodiment, this may cause Tx UE to keep carrying out unnecessary HARQ retransmissions to the maximum limit, as configured for the ongoing HARQ process, and result in an overall failure for the ongoing HARQ process. In an example embodiment, this may further cause unnecessary retransmission on higher layers due to failures of HARQ processes at Tx UE. In an example embodiment, one option to resolve this issue is to let Tx UE ignore or exclude those group members from which Tx UE detects HARQ DTX for the rest of the ongoing HARQ process. However, as HARQ DTX may not happen only to those group members that are not present in proximity of Tx UE, the option of ignoring or excluding those group members of detecting HARQ DTX might not be robust enough.

Observation 2: In an example embodiment, in case the number of group members which are present in proximity (in range) of Tx UE during an ongoing HARQ process is less than the group size given in the common group information Tx UE may have to carry out HARQ retransmissions at the maximum limit of the ongoing HARQ process.

In an example embodiment, the application layer at Tx UE may have updated knowledge of group members which are present in proximity of Tx UE in real time based on, e.g., frequent exchange of safety or group management related messages.

Observation 3: In an example embodiment, the application layer at Tx UE may have updated knowledge of group members which are present in proximity of Tx UE based on, e.g., frequent exchange of safety or group management related messages.

In an example embodiment, taking into account availability of the Tx UE specific group information which is updated to the AS layer by the application layer at Tx UE on-the-fly, Tx UE may be able to avoid unnecessary reception of PSFCH and retransmission for group members which are not present in proximity of Tx UE during the ongoing HARQ process.

Proposal 2: In an example embodiment, Tx UE of an ongoing HARQ process using HARQ feedback Option 2 takes into account the available Tx UE specific group information for the HARQ operation.

Proposal 3: In an example embodiment, RAN2 sends a LS to SA2 and keeps RAN1 cc-ed to make sure that the V2X application layer provides the common group information to all the group members and, furthermore, check and confirm the availability of the updated UE specific group information.

Conclusion

In an example embodiment, the following observations and proposals have been made in this contribution.

Observation 1: In an example embodiment, the group information (including member IDs and group size) which is used for deriving PSFCH resources for individual group members must be the same or common to all the group members.

Observation 2: In an example embodiment, in case the number of group members which are present in proximity (in range) of Tx UE during an ongoing HARQ process is less than the group size given in the common group information Tx UE may have to carry out HARQ retransmissions at the maximum limit of the ongoing HARQ process.

Observation 3: In an example embodiment, the application layer at Tx UE may have updated knowledge of group members which are present in proximity of Tx UE based on, e.g., frequent exchange of safety or group management related messages.

Proposal 1: In an example embodiment, HARQ feedback Option 2 uses the common group information for PSFCH mapping.

Proposal 2: In an example embodiment, Tx UE of an ongoing HARQ process using HARQ feedback Option 2 takes into account the available Tx UE specific group information for the HARQ operation.

Proposal 3: In an example embodiment, RAN2 sends a LS to SA2 and keeps RAN1 cc-ed to make sure that the V2X application layer provides the common group information to all the group members and, furthermore, check and confirm the availability of the updated UE specific group information.

Problem to be Solved According to Some Instant Example Embodiments

In an instant example embodiment, groupcast over sidelink (SL) or PC5 interface may use hybrid automatic repeat request (HARQ) with HARQ feedback of acknowledgement (ACK)/negative acknowledgement (NACK)/discontinuous transmission (DTX) sent on dedicated physical sidelink feedback channel (PSFCH) from individual Rx UEs of the user group. The instant example embodiments include a dedicated physical sidelink feedback channel (PSFCH) that is determined based on member identifier (ID) of individual receiving (Rx) UE within the user group. In an instant example embodiment, the PSFCH may also be determined based on a group size of the user group. In an example embodiment, the member ID and the group size is provided by the application layer, as discussed in 3GPP TS23.287 (which is incorporated herein by reference in its entirety), as described below:

The QoS handling described in clause 5.4.1.2 (above) is applied for all group communications, i.e. Application Layer connection-less group or Application Layer managed group. In addition, the following applies:
  The PFI and PC5 QoS parameters are negotiated during a Layer-2 link establishment procedure, as described in clause 6.3.3.1 (3GPP TS 23.287), or during the Layer-2 link modification procedure, as described in clause 6.3.3.4 (3GPP TS 23.287).
  If the V2X application layer provides a group size and a member ID for Application Layer managed group, the V2X layer passes them to the AS layer for groupcast control, as defined in 3GPP TS 38.300, which is incorporated herein by reference. It is assumed that the V2X application layer provides accurate and up-to-date information on the group size and the member ID.

STRUCTURAL EMBODIMENTS

FIG. 1 illustrates a simplified diagram of a wireless communication network 10, for explaining the instant example embodiments. In an example embodiment, the network 10 is a portion of a 3$^{rd}$ Generation Partnership Project (3GPP) New Radio (NR) access network 10. In an example embodiment, the 3GPP NR radio access deployment includes a base station (e.g., gNB 102) having transmission and reception points (TRPs) 102a, 102b, 102c. Each TRP 102a, 102b, 102c may be, for example, a remote radio head (RRH) or remote radio unit (RRU) including at least, for example, a radio frequency (RF) antenna (or antennas) or antenna panels, and a radio transceiver, for transmitting and receiving data within a geographical area. In an example embodiment, the TRP 102a, 102b, 102c are considered secondary cells (SCells), from the standpoint the TRP 102a, 102b, 102c are smaller cells that communicate in conjunction with a larger cell (e.g., gNB 102). The TRPs 102a, 102b, 102c provide cellular resources for user equipment (UEs) 106a, 106b, 106c, 106d within a geographical coverage area. In some cases, baseband processing may be divided between the TRPs 102a, 102b, 102c and gNB 102 in a 5th Generation (5G) cell. Alternatively, the baseband processing may be performed at the gNB 102. In the example shown in FIG. 1, the TRPs 102a, 102b, 102c are configured to communicate with the user equipments, or UEs (e.g., UE 106a), via one or more transmit (TX)/receive (RX) beam pairs. The gNB 102 communicates with a network core 1, which is referred to as the New Core in 3GPP NR.

The TRPs 102a, 102b, 102c may have independent schedulers, or the gNB 102 may perform joint scheduling among the TRPs 102a, 102b, 102c.

It should be understood that the gNB 102 and TRPs 102a, 102b, 102c can provide communication services to a relatively large number of UEs 106a, 106b, 106c, 106d within the coverage area of the TRPs 102a, 102b, 102c. For the sake of clarity of instant example embodiments, communication services (including transmitting and receiving wireless signals) will be discussed with regard to the network 10 of FIG. 1, though it should be understood that the network 10 can contain any number of base stations (e.g., gNB 102), any number of secondary cells (e.g., TRP 102a), or no secondary cells, and any number of user equipments (e.g., UE 106a, 106b, 106c, 106d).

Figure 2:
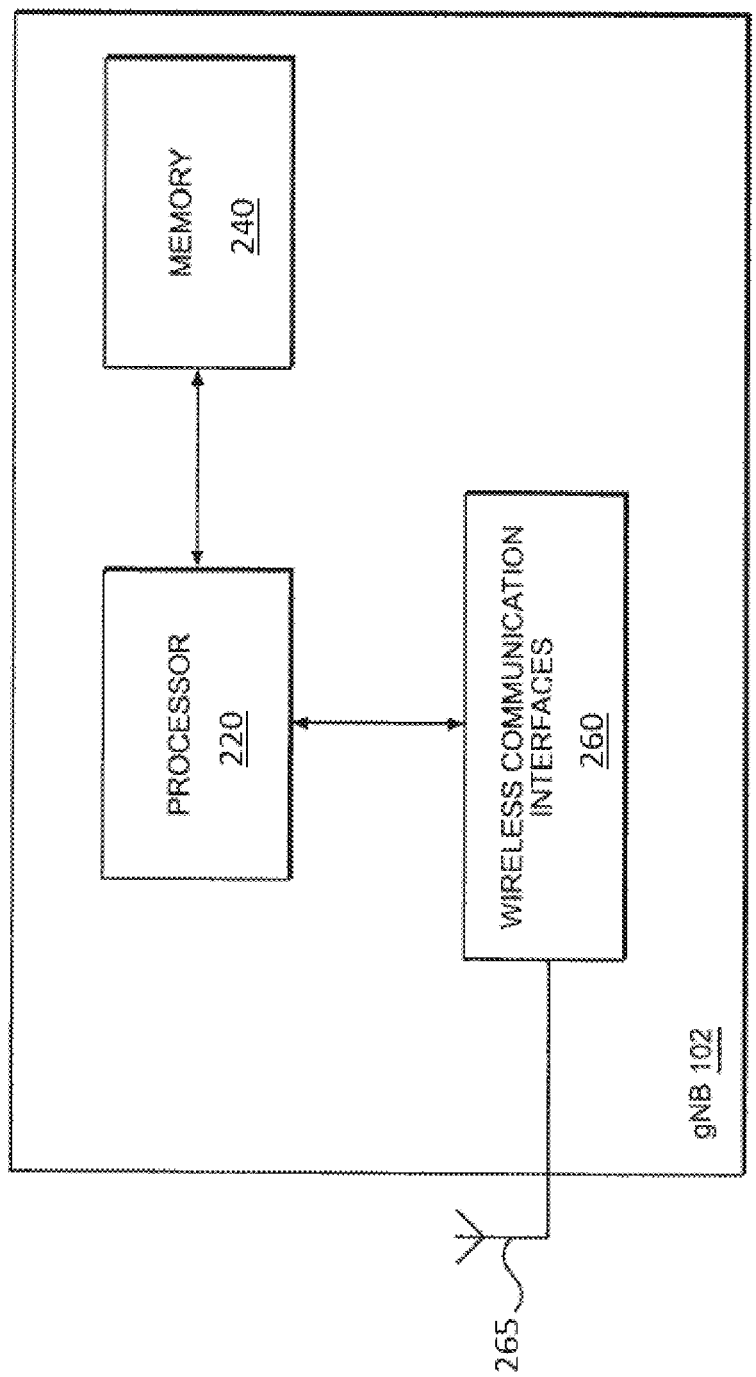
FIG. 2 illustrates a block diagram of a base station, in accordance with an example embodiment.

FIG. 2 illustrates a block diagram of a base station, where the base station can for example be a gNB 102 (shown in FIG. 1), in accordance with an example embodiment. In an example embodiment, other types of base stations are contemplated for use in the network 10 of FIG. 1, where the other types of base stations include the same structural elements that are described herein. In an example embodiment, and as shown in FIG. 2, the gNB 102 includes: a memory 240; a processor 220 connected to the memory 240; various interfaces 260 connected to the processor 220; and one or more antennas or antenna panels 265 connected to the various interfaces 260. The various interfaces 260 and the antenna 265 may constitute a transceiver for transmitting/receiving data from/to the gNB 102 via a plurality of wireless beams or from/to the plurality of TRPs 102a, 102b, 102c, etc. As will be appreciated, depending on the implementation of the gNB 102, the gNB 102 may include many more components than those shown in FIG. 2. However, it is not necessary that all of these components be shown in order to disclose the illustrative example embodiment.

The memory 240 may be a computer readable storage medium that generally includes a random access memory (RAM), read only memory (ROM), and/or a permanent mass storage device, such as a disk drive. The memory 240 also stores an operating system and any other routines/modules/applications for providing the functionalities of the gNB 102 (e.g., functionalities of a gNB, methods according to the example embodiments, etc.) to be executed by the processor 220. These software components may also be loaded from a separate computer readable storage medium into the memory 240 using a drive mechanism (not shown). Such separate computer readable storage medium may include a disc, tape, DVD/CD-ROM drive, memory card, or other like computer readable storage medium (not shown). In some example embodiments, software components may be loaded into the memory 240 via one of the various interfaces 260, rather than via a computer readable storage medium.

The processor 220 may be configured to carry out instructions of a computer program by performing the arithmetical, logical, and input/output operations of the system. Instructions may be provided to the processor 220 by the memory 240.

The various interfaces 260 may include components that interface the processor 220 with the antenna 265, or other input/output components. As will be understood, the various interfaces 260 and programs stored in the memory 240 to set forth the special purpose functionalities of the gNB 102 will vary depending on the implementation of the gNB 102.

The interfaces 260 may also include one or more user input devices (e.g., a keyboard, a keypad, a mouse, or the like) and user output devices (e.g., a display, a speaker, or the like).

Although not specifically discussed herein, the configuration shown in FIG. 2 may be utilized to implement, inter alia, the TRPs 102a, 102b, 102c, other radio access and backhaul network elements and/or devices. In this regard, for example, the memory 240 may store an operating system and any other routines/modules/applications for providing the functionalities of the TRPs, etc. (e.g., functionalities of these elements, methods according to the example embodiments, etc.) to be executed by the processor 220.

Figure 3:
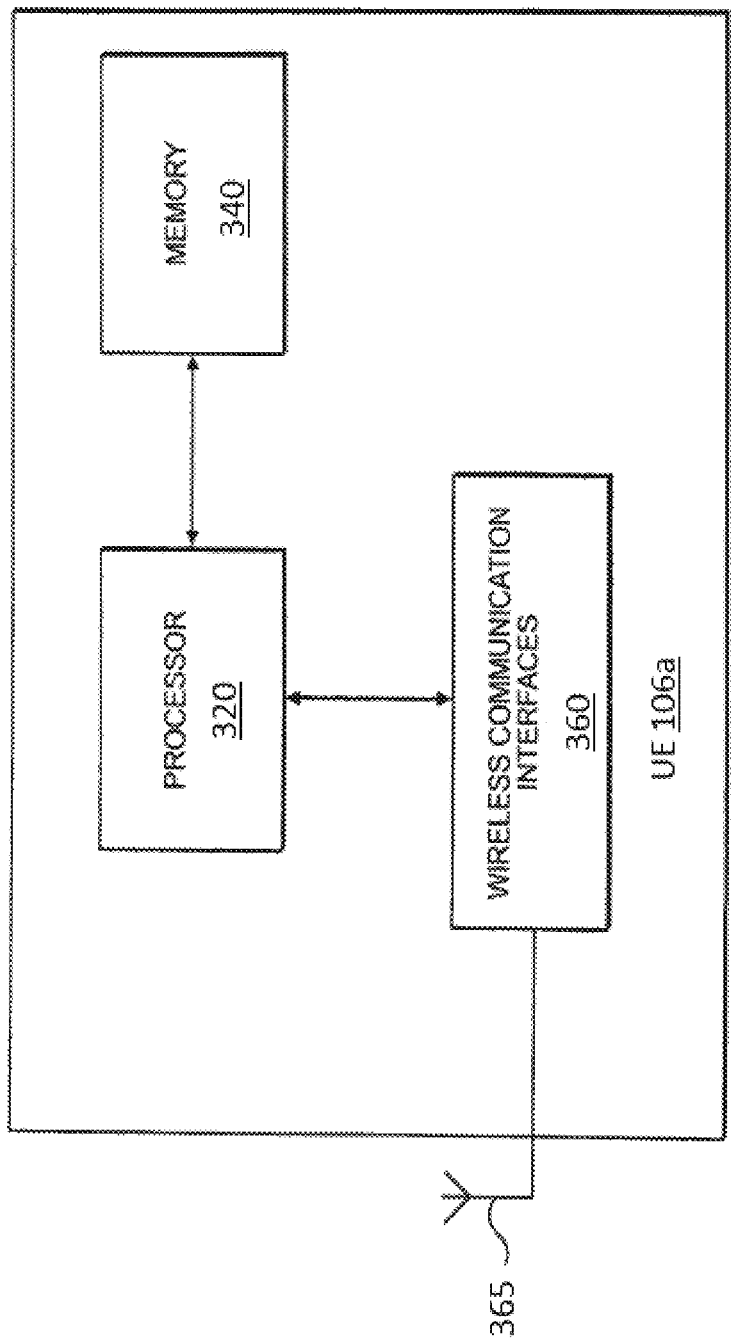
FIG. 3 illustrates a block diagram of a user equipment (UE), in accordance with an example embodiment.

FIG. 3 illustrates a block diagram of the user equipment (UE) 106a, in accordance with an example embodiment. It should be understood that the other UEs 106b, 106c, 106d have the same structure. In an example embodiment, the UE 106a is a device used by an end-user to communicate via the network 10 of FIG. 1. Examples of UEs include cellular phones, smartphones, tablet, computers, laptop computers, vehicles, in-vehicle devices, other internet-of-things (IoT) devices, or the like.

As shown, the UE 106a includes: a memory 340; a processor 320 connected to the memory 340; various interfaces 360 connected to the processor 320; and one or more antennas or antenna panels 365 connected to the various interfaces 360. The various interfaces 360 and the antenna 365 may constitute a transceiver for transmitting/receiving data to/from the gNB 102 via a plurality of wireless beams or to/from the plurality of TRPs 102a, 102b, 102c, etc. As will be appreciated, depending on the implementation of the UE 106a, the UE 106a may include many more components than those shown in FIG. 3. However, it is not necessary that all of these generally conventional components be shown in order to disclose the illustrative example embodiment.

The memory 340 may be a computer readable storage medium that generally includes a random access memory (RAM), read only memory (ROM), and/or a permanent mass storage device, such as a disk drive. The memory 340 also stores an operating system and any other routines/modules/applications for providing the functionalities of the UE 106a (e.g., functionalities of a UE, methods according to the example embodiments, etc.) to be executed by the processor 320. These software components may also be loaded from a separate computer readable storage medium into the memory 340 using a drive mechanism (not shown). Such separate computer readable storage medium may include a disc, tape, DVD/CD-ROM drive, memory card, or other like computer readable storage medium (not shown). In some example embodiments, software components may be loaded into the memory 340 via one of the various interfaces 360, rather than via a computer readable storage medium.

The processor 320 may be configured to carry out instructions of a computer program by performing the arithmetical, logical, and input/output operations of the system. Instructions may be provided to the processor 320 by the memory 340.

The various interfaces 360 may include components that interface the processor 320 with the antenna 365, or other input/output components. As will be understood, the various interfaces 360 and programs stored in the memory 340 to set forth the special purpose functionalities of the UE 106a will vary depending on the implementation of the UE 106a.

The interfaces 360 may also include one or more user input devices (e.g., a keyboard, a keypad, a mouse, or the like) and user output devices (e.g., a display, a speaker, or the like).

General Methodology—Mapping

In an example embodiment, a first group information (the overall group size and member ID) may be used by the Rx UE 106b to determine PSFCH resource. In an example embodiment, a second group information is used to update (revise) a group size (e.g., the actual group size) of active group members and the member ID of those active members. Herein the member ID for each Rx UE (e.g., 106b, 106c) in first group information and second group information should not change. Upon getting the updated second group information, the transmission on the ongoing HARQ process is adapted accordingly.

General Methodology—Enhanced HARQ

Some example embodiments resolve possible impacts of the accuracy and timing of the group information update on HARQ operation and performance for SL groupcast.

In an example embodiment, Tx UE behaviors are proposed to enhance HARQ with dedicated feedback used for SL groupcast adapted to the accuracy and timing of the updated group information as follows:

1. In an example embodiment, Tx UE of SL groupcast is updated with the group information consisting of members which are considered as being present in proximity of Tx UE currently. In an example embodiment, this update may be periodic or event-triggered.

2. In an example embodiment, Tx UE is configured to adapt the current HARQ process based on the latest updated group information received during the current HARQ process depending on change in the group configuration and QoS requirement of the ongoing data with at least one of the following options (see A.-D., below).

A. In an example embodiment, the processor 320 of the Tx UE 106a continues with the current HARQ process and ignores the update. In an example embodiment, this option is further conditioned to cases in which the group update implies no change, or a reduction of the group, which has no impact to the current HARQ process (including the case that the Tx UE terminates the HARQ process if NACK is received from some member(s) of the previous group that are now not in the updated group and ACK is received from the rest of the updated group). or the update has no notable impact from QoS perspective. The latter is referred to cases in which some packet losses over a certain time limit may be tolerable for the groupcast (such as in voice group calls). Otherwise, one of the following options may be considered.

B. In an example embodiment, the processor 320 of the Tx UE 106a continues with the current HARQ process using self-decodable redundancy version of the transport block (TB), and extends the HARQ process with a determined number of HARQ retransmissions on top of the determined maximum number of HARQ retransmissions, if there are more group members in the updated group. In an example embodiment, this allows both the new and the existing group members which have not received the TB to proceed with the current HARQ process without a start-over and thus the existing group members do not lose the combining gains using the previously received redundancy version(s) of the TB.

C. In an example embodiment, the processor 320 of the Tx UE 106a continues with the current HARQ process for the existing members, which remain in the updated group and have not received the TB (NACK is previously received from these members), and initiates a new HARQ process of the current TB, the new HARQ process is addressed to new UE(s) added to the group.

C.1. In an example embodiment, a 1-bit indication may be introduced in SCI to indicate that the new HARQ process is for the existing TB so that the existing members of the group (remaining from the previous update) can ignore the new HARQ process.

D. In an example embodiment, the processor 320 of the Tx UE 106a restarts the current HARQ process with NDI or terminates the current HARQ process and initiates a new one for the current TB or a new TB including the data of the current TB, e.g., in case the HARQ process has just been started with the first transmission and no HARQ feedback (either ACK/NACK/DRX) has been received yet or no ACK has been received yet or a number of NACKs received is high enough.

3. In an example embodiment, Tx UE upon receiving/detecting HARQ DTX from a member for a determined number of times during the current HARQ process may consider that the member is out of proximity. In an example embodiment, Tx UE may be configured to carry out at least one of the following options (see a. and b, below).

a. In an example embodiment, Tx UE ignores the member for the rest of the current HARQ process.

b. In an example embodiment, the access layer at Tx UE which is responsible for controlling and performing the current HARQ process reports the member to the upper layer (the application layer) at Tx UE. This implies that, for an example, the processor of the Tx UE 106a logs an identity of the member within the upper layer of the Tx UE 106a.

SPECIFIC EXAMPLE EMBODIMENTS

Figure 4:
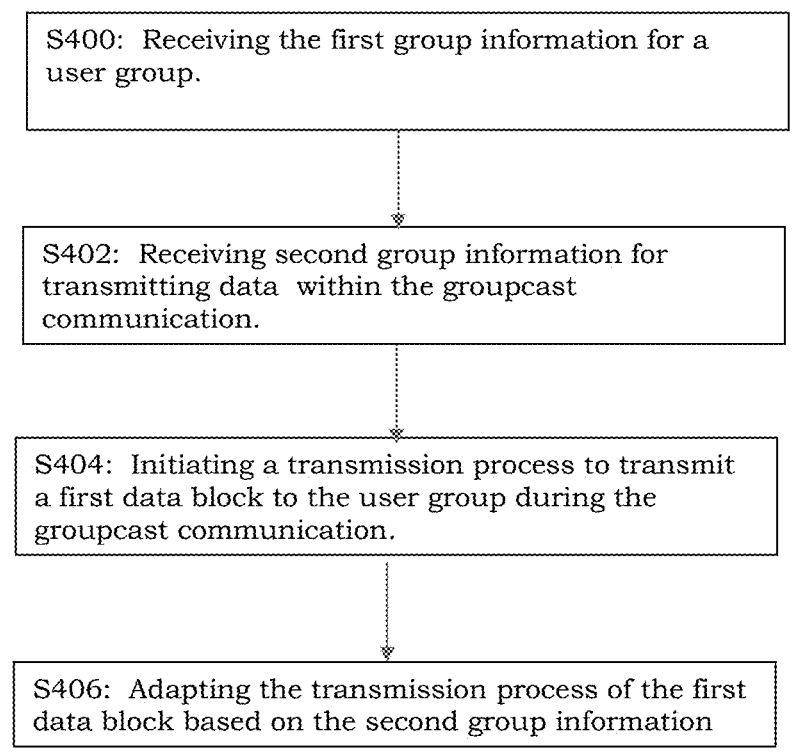
FIG. 4 illustrates a method of initiating a communication process, in accordance with an example embodiment.

FIG. 4 illustrates a method of initiating a communication process, in accordance with an example embodiment. In an example embodiment, the steps of the method are performed by the processor 320 of the Tx UE 106a.

In an example embodiment, and as shown in step S400, the processor 320 of the Tx UE 106a receives first group information for a user group, the first user group information including information for mapping a sidelink channel resource for each user-device member of the user group to perform a first groupcast communication over a first sidelink for the user group. In an example embodiment, the Tx UE 106a is a member of the user group.

In an example embodiment, and as shown in step S402, the processor 320 of the Tx UE 106a receives second group information for transmitting data within the first groupcast communication. In an example embodiment, the second group information includes updated information of the first group information that is specific to the Tx UE 106a.

In an example embodiment, and as shown in S404, the processor 320 of the Tx UE 106a initiates a transmission process to transmit a first data block to the user group for the groupcast communication over the sidelink based on the first group information.

In an example embodiment, and as shown in S406, the processor 320 of the Tx UE 106a adapts the transmission process of the first data block based on the second group information.

Figure 5:
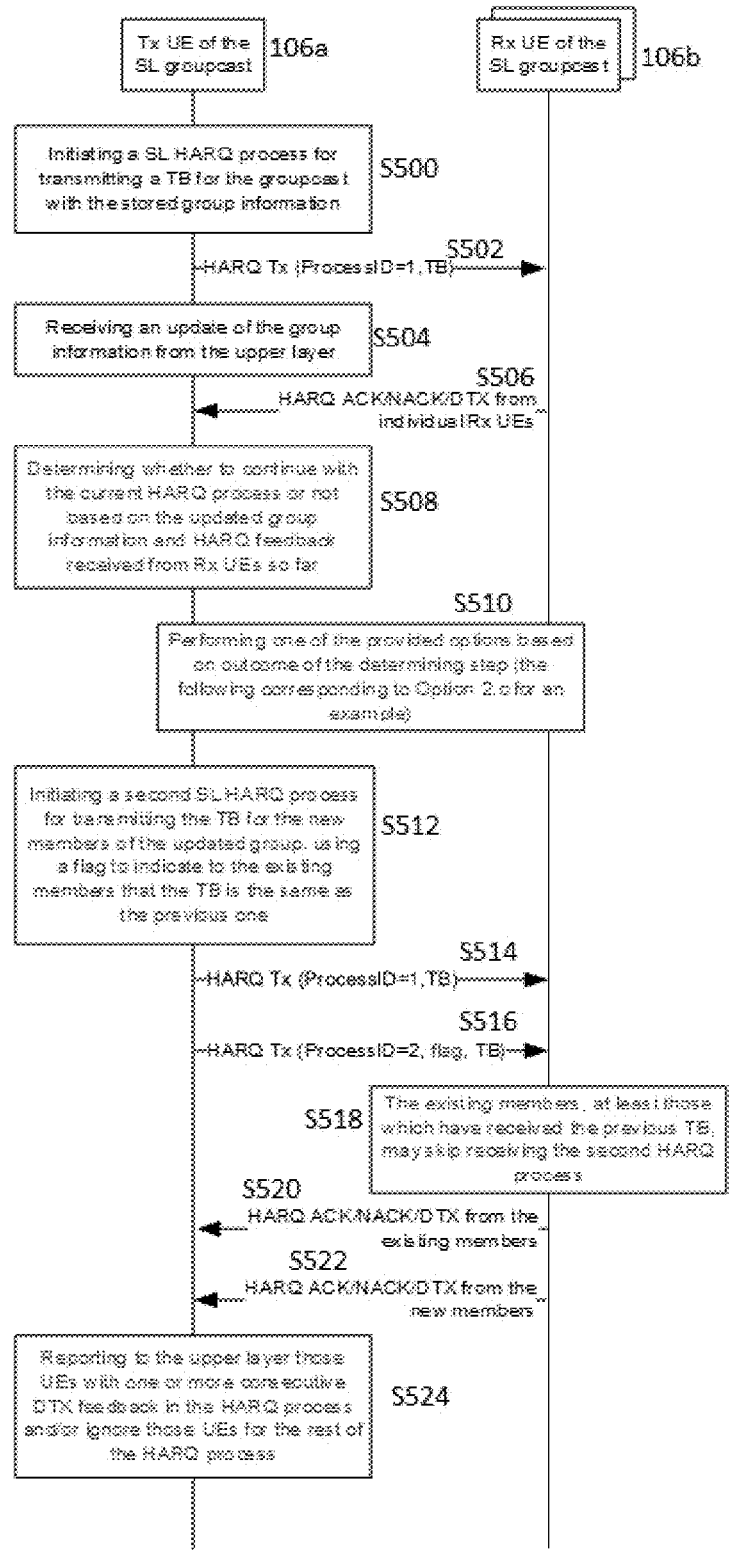
FIG. 5 illustrates a signaling diagram, in accordance with an example embodiment.

FIG. 5 illustrates a signaling diagram, in accordance with an example embodiment. In an example embodiment, and as shown in step S500, the processor 320 of a transmitting UE (e.g., Tx UE 106a) initiates a first sidelink transmission process for transmitting a transport block (TB), or data block, for a groupcast communication involving user-device members (e.g., UE 106b, 106c, 106d) of a user group, using stored group information. In an example embodiment, the Tx UE 106a is a member of the user group. In an example embodiment, the transmission process is a HARQ transmission process. In an example embodiment, and as shown in step S502, the processor 320 of the Tx UE 106a transmits a HARQ TB to a plural of receiving UE (e.g., Rx UE 106b), where the Rx UE 106b is member of the user group for the groupcast communication. In an example embodiment, steps S500 and S502 are corresponding to step S404 of FIG. 4.

In an example embodiment, and as shown in step S504, the processor 320 of Tx UE 106a receives an update (updated information) of the group information (second group information) from an upper layer (e.g., the application layer) at Tx UE 106a. The update may be based on information exchange on the application layer between members of the user group for examples. In an example embodiment, and as shown in step S506, the processor 320 of the Tx UE 106a receives feedback information (either HARQ ACK/NACK/DRX) from the members of the group on dedicated PSFCHs. In an example embodiment, the feedback information is HARQ feedback information. In an example embodiment, the steps S504 and S506 are corresponding to step S402 of FIG. 4.

In an example embodiment, the step S504 can occur prior to initiating the first sidelink transmission process (step S500), or step S504 can occur after initiation of the first sidelink transmission process (e.g., once step S500 is underway), where step S504 may for instance occur while step S502 (transmission of the first sidelink transmission process) is occurring, or occurring in part.

In an example embodiment, and as shown in step S508, the processor 320 of the Tx UE 106a determines whether to continue with the current transmission process, or not, based on the update information, and based on the feedback information. In an example embodiment, and as shown in step S510, the processor 320 of the Tx UE 106a, and the processor 320 of the Rx UE 106b, jointly perform one of the options (described above), based on the determination made in step S508. This step corresponds to "option 2 C" described above.

In an example embodiment, and as shown in step S512, the processor 320 of the Tx UE 106a initiates a second sidelink transmission process for transmitting the transport block. In an example embodiment, this second transmission process is directed at a changed number of members of the user group. In an example embodiment, the second transmission process is initiated to transmit the same transport block that was included in the first transmission process. In an example embodiment, the second transmission process includes a flag (indicator) to the user group, that indicates to the user group (e.g., existing and/or changed members of the user group) that the transport block is the same transport block that was included in the first sidelink transmission process. In an example embodiment, step S512 is corresponding to step S406 of FIG. 4.

In an example embodiment, and as shown in step S514, the processor 320 of the Tx UE 106a transmits the second sidelink transmission process to Rx UE 106b. In an example embodiment, and as shown in step S516, alternative to the step S514, the processor 320 of the Tx UE 106a sends the second sidelink transmission process with the flag (indicator), as described above.

In an example embodiment, and as shown in step S518, the processor 320 of the existing members of the user group, including the processor 320 of Rx UE 106b, skip the second sidelink transmission process, once the processor 320 of the existing members receive the flag (indicator).

In an example embodiment, and as shown in step S520, the processor 320 of the Rx UE 106b, and other existing members of the user group, transmit feedback information (ACK/NACK/DTX) to the Tx UE 106a. In an example embodiment, and as shown in step S522, added (new) members of the user group send the feedback information to the Tx UE 106a.

In an example embodiment, and as shown in step S524, the processor 320 of the Tx UE 106a reports on the group information based on the received HARQ feedback information to the upper layer at the Tx UE. In an example embodiment, for instance in this step, the processor 320 of the Tx UE 106a reports on the Rx UE with one or more consecutive DTX HARQ feedback information, as detected by the Tx UE, to the upper layer (application layer) at the Tx UE. This information may be used by the upper layer for group management. In an example embodiment, the Tx UE is configured to ignore that Rx UE with one or more consecutive DTX HARQ feedback information for the rest of the transmission process.

In an example embodiment, and as shown in step S508, the processor 320 of the Tx UE 106a

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, an as Evolved Node B (eNBs), a remote radio head (RRH), a 5G base station (gNBs), femto base stations, network controllers, computers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the present disclosure. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method, comprising:
receiving, by at least one first processor of a first user equipment (UE), first group information for a user group with user-device members, the first group information including information for mapping a sidelink channel resource for each of the user-device members to perform a groupcast communication over sidelink for the user group, the first UE being a user-device member of the user group, wherein the sidelink channel resource is a physical sidelink feedback channel (PSFCH);
receiving, by the at least one first processor, second group information for transmitting data within the groupcast communication, the second group information including updated information of the first group information that is specific to the first UE;
initiating, by the at least one first processor, a first transmission process to transmit a first data block to the user group for the groupcast communication over the sidelink based on the first group information, wherein the first transmission process is a hybrid automatic repeat request (HARQ) process over the sidelink; and
adapting, by the at least one first processor, the first transmission process of the first data block based on the second group information,
wherein the receiving of the second group information occurs after the initiating of the first transmission process and during a time period while the first transmission process is ongoing,
wherein the first feedback information is HARQ feedback information that includes discontinuous transmission (DTX) information,
the method further comprising:
receiving the DTX feedback information from at least one first user-device, of the user-device members, following the initiating of the first transmission process;
initiating a reporting of an identity of the at least one first user device from an access layer to an application layer at the first UE; and
ignoring the at least one first user-device during a remainder of the first transmission process.

2. The method of claim 1, wherein the first UE of is updated with group information consisting of members that are present in proximity of the first UE currently, wherein the update is periodic or event-triggered.

3. The method of claim 2, wherein the first UE is configured to adapt the current HARQ process based on the latest updated group information received during the current HARQ process based on change in the group configuration and quality of service requirement of ongoing data.

4. The method of claim 3, wherein the processor of the first UE continues with the current HARQ process and ignores the update, wherein for cases in which the group update implies no change or a reduction of the group which has no impact to the current HARQ process or the update has no impact on quality of service, a wherein a 1-bit indication indicates that the new HARQ process is for the existing transmission block causing the existing members of the group to ignore the new HARQ process, wherein an access layer at the first UE controls and performs the current HARQ process and reports the member to an upper layer at the first UE,
the method further comprising:
the processor of the first UE logging an identity of the member within the upper layer of the first UE,
the processor of the first UE restarting the current HARQ process with NDI or terminating the current HARQ process and initiating a new one for the current transmission block or a new transmission block including the data of the current transmission block.

5. The method of claim 1, further comprising:
receiving first feedback information from the user group,
wherein the adapting of the first transmission process includes determining whether to continue with the first transmission process, based on the second group information and the first feedback information,
wherein the adapting of the first transmission process further includes:
initiating a second transmission process to transmit a second data block to the user group for the groupcast communication over the sidelink based on the second group information,
wherein the second transmission process includes an indicator that indicates to the user group that the first data block in the first transmission process and the second data block in the second transmission process are the same data block,
the method further comprising:
receiving second feedback information from at least one first user device, of the user device members of the user group, that the first data block of the first transmission process was received, the second feedback information indicating that the at least one first user device will ignore the second transmission process.

6. A first network node, comprising:
a memory containing computer-readable instructions; and
at least one first processor configured to read and execute the computer-readable instructions, in order to,
receive first group information for a user group with user-device members, the first group information including information for mapping a sidelink channel resource for each of the user-device members to perform a groupcast communication over sidelink for the user group, the first network node being a user-device member of the user group,
receive second group information for transmitting data within the groupcast communication, the second group information including updated information of the first group information that is specific to the first network node,
initiate a first transmission process to transmit a first data block to the user group for the groupcast communication over the sidelink based on the first group information, and
adapt the first transmission process of the first data block based on the second group information,
wherein the first transmission process is a hybrid automatic repeat request (HARQ) process over the sidelink,
wherein the first feedback information is HARQ feedback information that includes discontinuous transmission (DTX) information
wherein the at least one first processor is further configured to:

receive DTX feedback information from at least one first user-device, of the user-device members, following the initiating of the first transmission process, initiate a reporting of an identity of the at least one first user device from an access layer to an application layer at the first UE, and ignore the at least one first user-device during a remainder of the first transmission process, wherein the at least one first processor is configured to receive the second group information after the initiating of the first transmission process and during a time period while the first transmission process is ongoing.

7. The first network node of claim 6, wherein the sidelink channel resource is a physical sidelink feedback channel (PSFCH).

8. The first network node of claim 7, wherein the at least one first processor is further configured to:

receive first feedback information from the user group, wherein the adapting of the first transmission process includes determining whether to continue with the first transmission process, based on the second group information and the first feedback information.

9. The first network node of claim 8, wherein the at least one first processor is configured to adapt the first transmission process by:

initiating a second transmission process to transmit a second data block to the user group for the groupcast communication over the sidelink based on the second group information.

10. The first network node of claim 9, wherein the second transmission process includes an indicator that indicates to the user group that the first data block in the first transmission process and the second data block in the second transmission process are the same data block.

11. The first network node of claim 10, wherein the at least one first processor is further configured to:

receive second feedback information from at least one first user-device, of the user-device members of the user group, that the first data block of the first transmission process was received, the second feedback information indicating that the at least one first user-device will ignore the second transmission process.

* * * * *